(12) United States Patent
Takakuwa et al.

(10) Patent No.: US 11,752,585 B2
(45) Date of Patent: Sep. 12, 2023

(54) METHOD FOR SUPPLYING CUTTING OIL

(71) Applicant: Matsuura Machinery Corporation, Fukui (JP)

(72) Inventors: Hiroaki Takakuwa, Fukui (JP); Ryuji Hirose, Fukui (JP); Hiroshi Arakawa, Fukui (JP)

(73) Assignee: Matsuura Machinery Corporation, Fukui (JP)

( * ) Notice: Subject to any disclaimer, the term of this patent is extended or adjusted under 35 U.S.C. 154(b) by 290 days.

(21) Appl. No.: 17/185,704

(22) Filed: Feb. 25, 2021

(65) Prior Publication Data
US 2021/0178543 A1 Jun. 17, 2021

Related U.S. Application Data

(62) Division of application No. 16/121,946, filed on Sep. 5, 2018, now Pat. No. 10,946,490.

(30) Foreign Application Priority Data

Sep. 15, 2017 (JP) ................................. 2017-177811

(51) Int. Cl.
| | |
|---|---|
| B23Q 11/10 | (2006.01) |
| G05B 13/02 | (2006.01) |
| G05B 13/04 | (2006.01) |
| F16N 7/00 | (2006.01) |
| G05B 11/00 | (2006.01) |

(52) U.S. Cl.
CPC ............ *B23Q 11/1046* (2013.01); *F16N 7/00* (2013.01); *G05B 13/024* (2013.01); *G05B 13/041* (2013.01); *G05B 11/00* (2013.01)

(58) Field of Classification Search
None
See application file for complete search history.

(56) References Cited

U.S. PATENT DOCUMENTS

| | | | |
|---|---|---|---|
| 5,115,403 A | 5/1992 | Yoneda | |
| 5,182,434 A | 1/1993 | Nakata | |
| 10,414,008 B2 | 9/2019 | Takakuwa et al. | |
| 2001/0007200 A1 | 7/2001 | Ravenet et al. | |

(Continued)

FOREIGN PATENT DOCUMENTS

| | | | |
|---|---|---|---|
| DE | 10132857 A1 * | 1/2003 | ........... B23B 29/046 |
| JP | 60-7927 A | 1/1985 | |

(Continued)

*Primary Examiner* — Jason D Mitchell
(74) *Attorney, Agent, or Firm* — Richard M. Goldberg

(57) ABSTRACT

A method for supplying cutting oil which is able to attain the above object by adopting the following processes in a machine tool for cutting work pieces.

a. setting of individual cutting times to each work piece and selection of cutting oil to be used,
b. setting of a quantity of the cutting oil supplied per unit time to a cutting area where the cutting oil selected by the process a is used,
c. supplying the cutting oil to a cutting-oil tank, with a state kept that the cutting oil remains in the cutting-oil tank, and
d. supplying the cutting oil to the cutting area on cutting each of the work pieces by setting a quantity of the cutting oil as a quantity obtained by multiplying individual cutting times according to the process a with a cutting quantity per individual unit times according to the process b.

2 Claims, 6 Drawing Sheets

(56) References Cited

U.S. PATENT DOCUMENTS

| | | | |
|---|---|---|---|
| 2004/0035282 A1 | 2/2004 | Tsujimoto | |
| 2007/0264910 A1 | 11/2007 | Ooka et al. | |
| 2008/0215177 A1 | 9/2008 | Utsumi et al. | |
| 2010/0247262 A1 | 9/2010 | Sakane et al. | |
| 2012/0031705 A1 | 2/2012 | Divisi | |
| 2014/0196273 A1 | 7/2014 | Balaji et al. | |
| 2014/0271002 A1 | 9/2014 | Hoshino | |
| 2015/0330564 A1 | 11/2015 | Mueller et al. | |
| 2017/0066096 A1 | 3/2017 | Boelkins et al. | |
| 2017/0113315 A1* | 4/2017 | Bangma | B23Q 11/1046 |
| 2018/0073563 A1 | 3/2018 | Nakanishi | |
| 2019/0049939 A1 | 2/2019 | Kato et al. | |
| 2019/0196439 A1 | 6/2019 | Sugita et al. | |
| 2020/0039016 A1 | 2/2020 | Boelkins et al. | |
| 2020/0206858 A1 | 7/2020 | Davis et al. | |

FOREIGN PATENT DOCUMENTS

| | | |
|---|---|---|
| JP | 62-78246 U | 5/1987 |
| JP | 2-106250 A | 4/1990 |
| JP | 3-47743 U | 5/1991 |
| JP | 5-16112 U | 3/1993 |
| JP | 6-23612 A | 2/1994 |
| JP | 6-23651 A | 2/1994 |
| JP | 8-196826 A | 8/1996 |
| JP | 11-28639 A | 2/1999 |
| JP | 5202142 B2 | 2/2013 |
| JP | 2014-176942 A | 9/2014 |
| JP | 2016-087741 A | 5/2016 |

* cited by examiner

[Fig. 1]
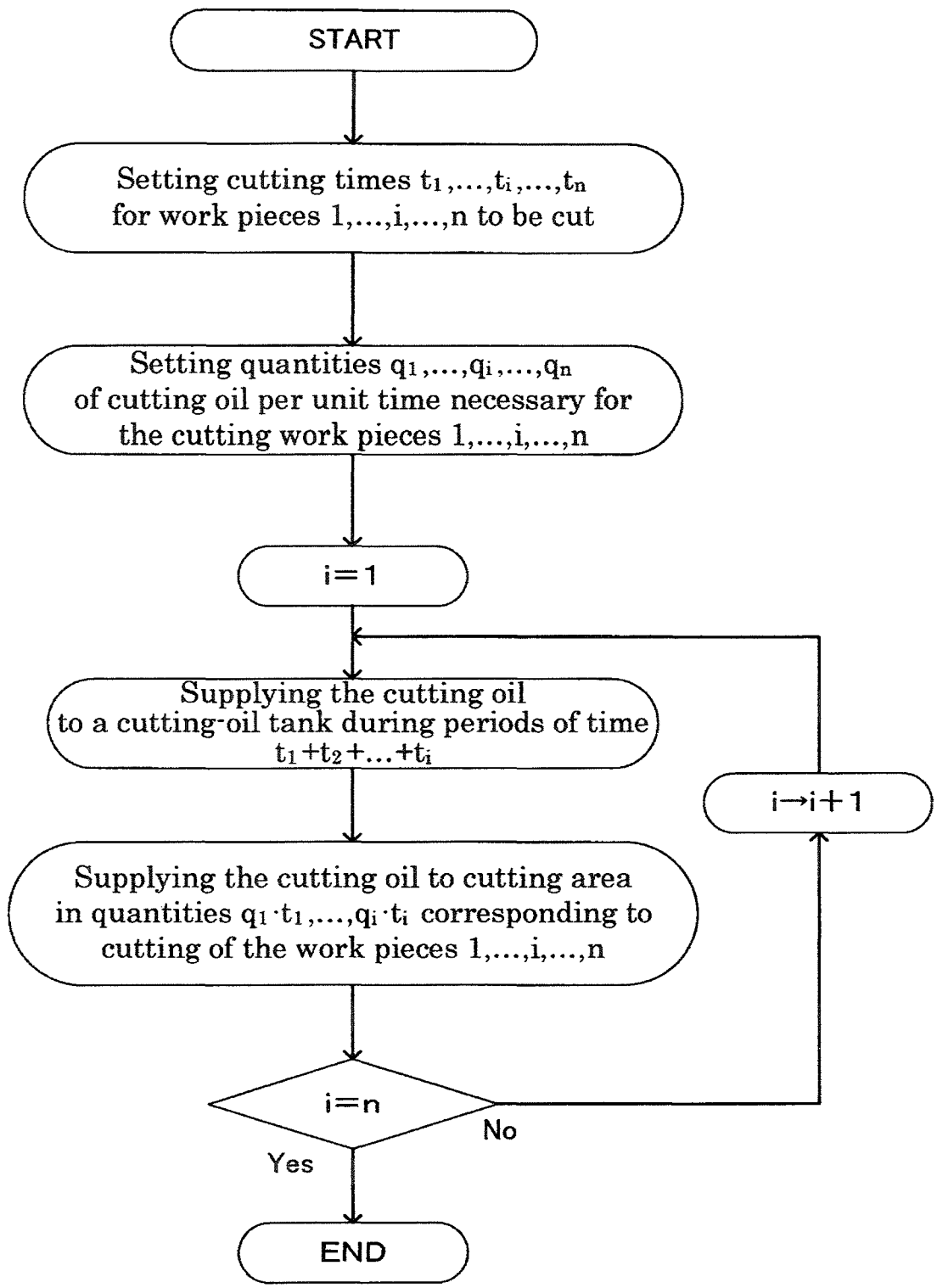

[Fig. 2]
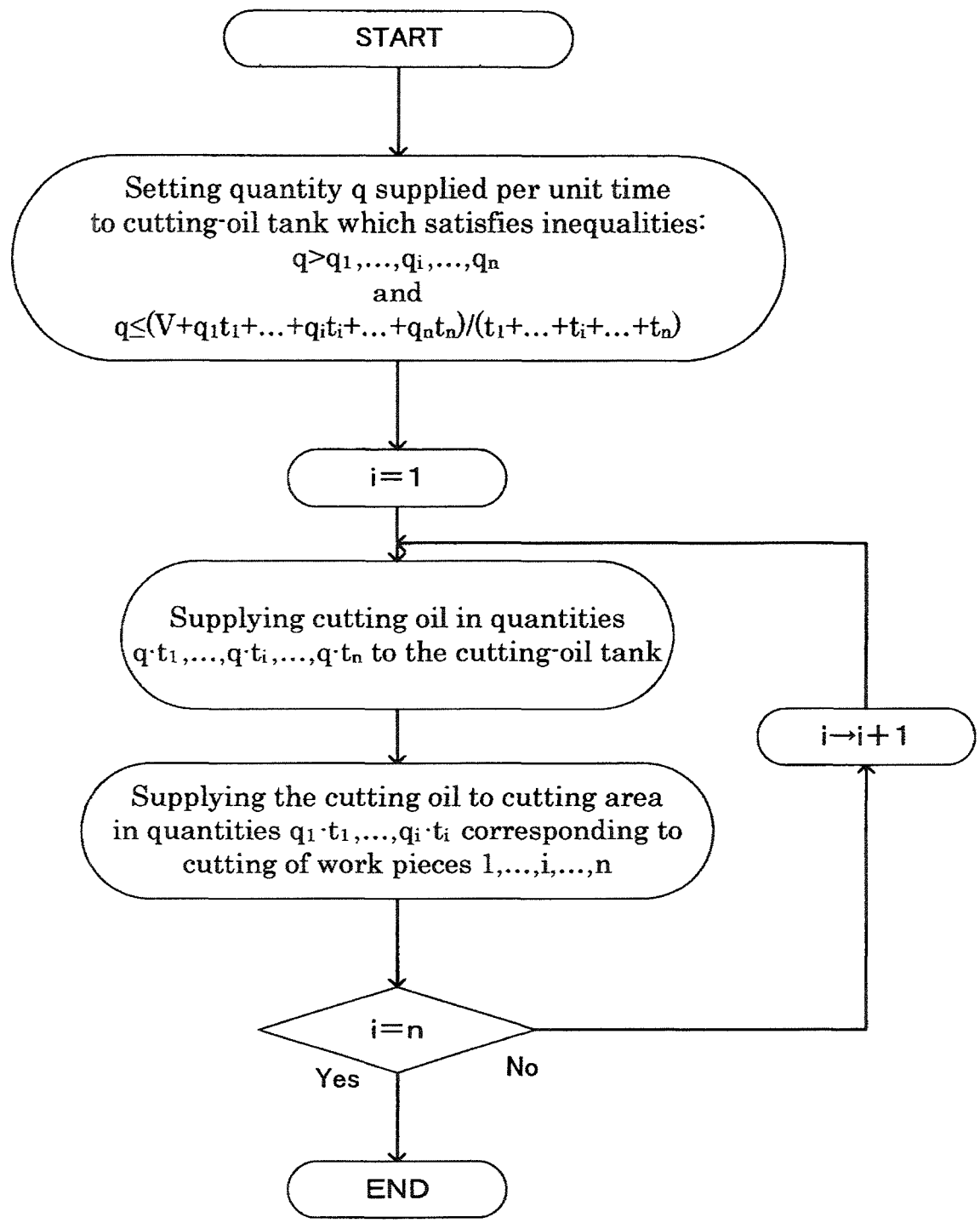

[Fig. 3]
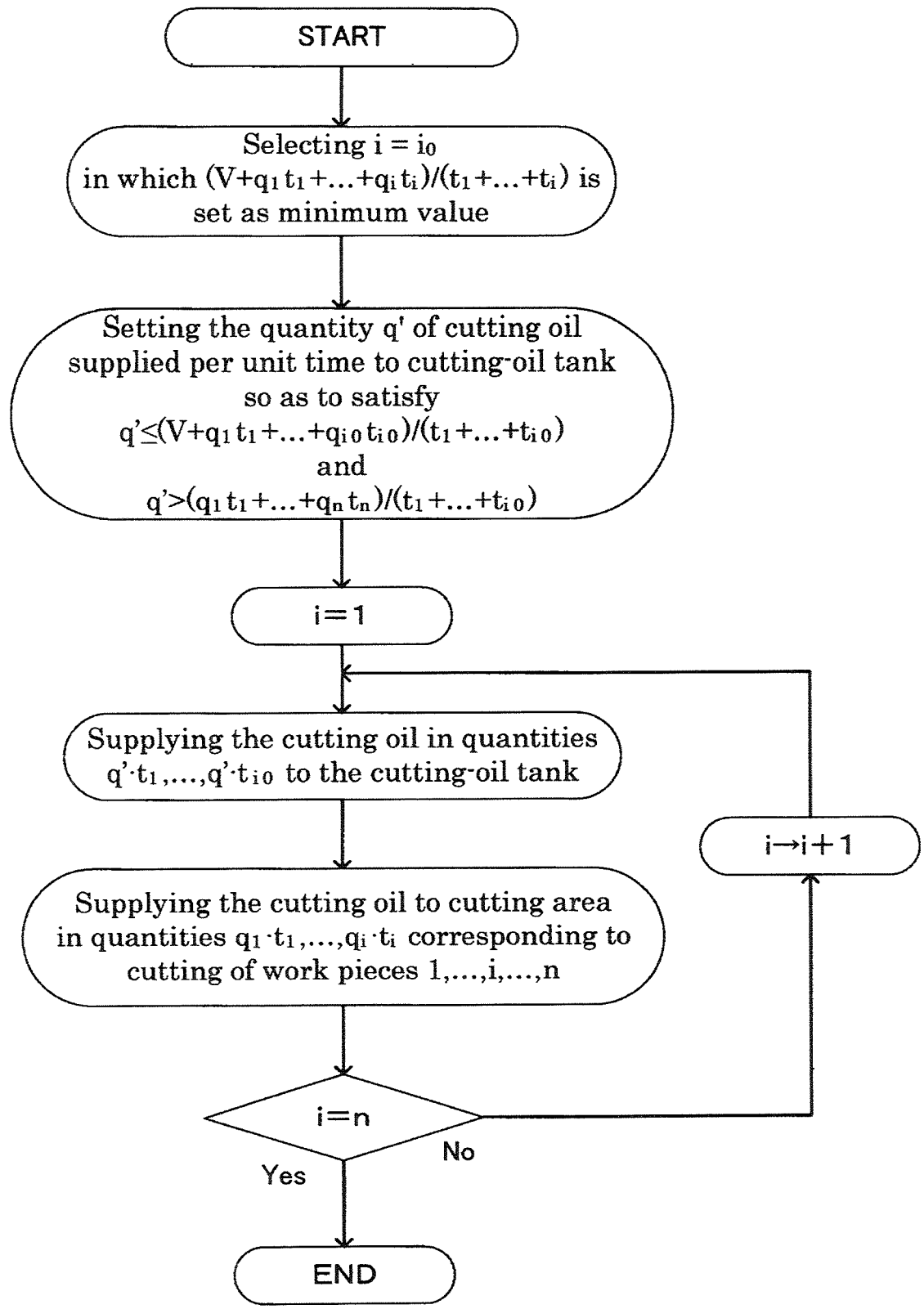

[Fig. 4]
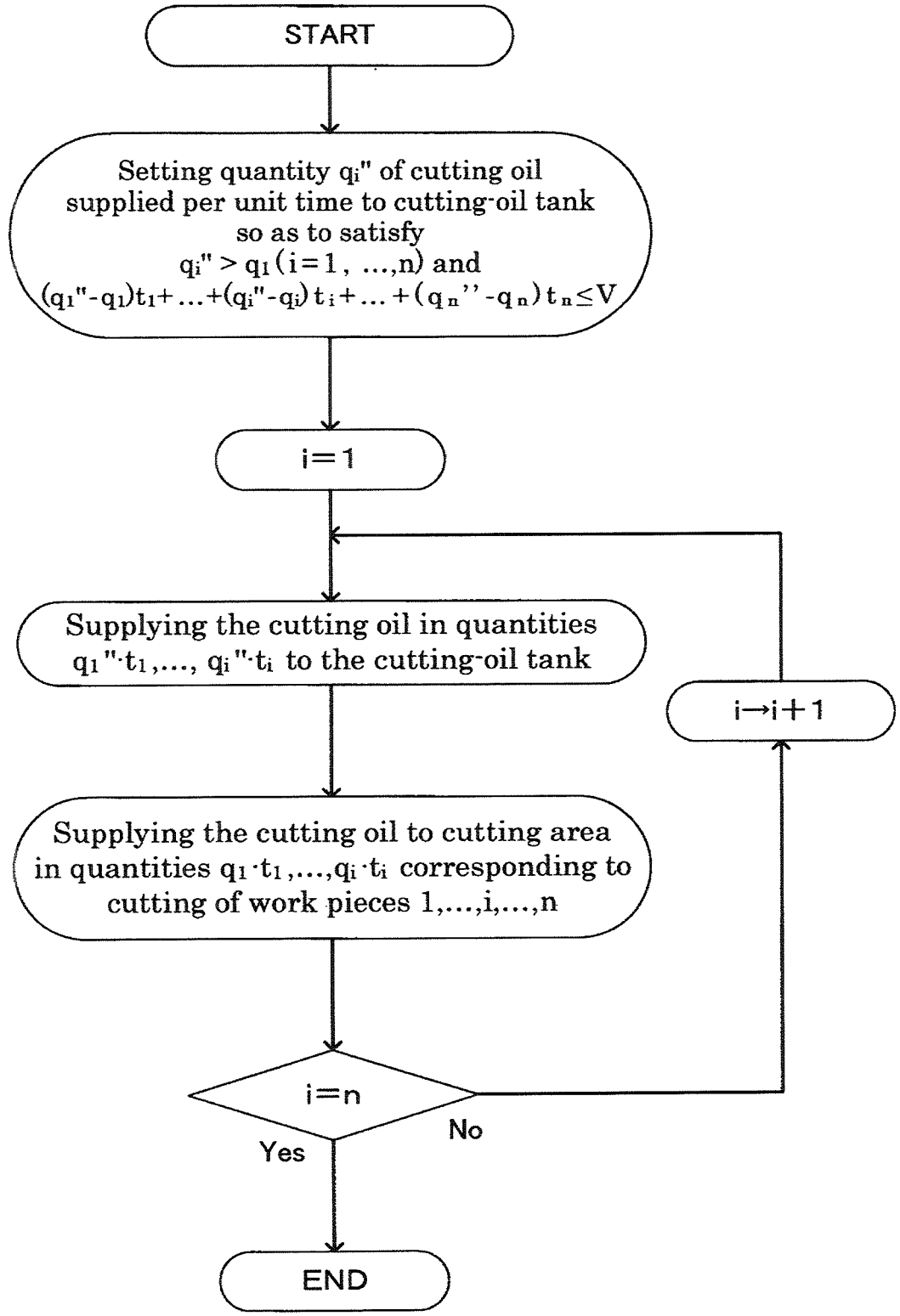

[Fig. 5]
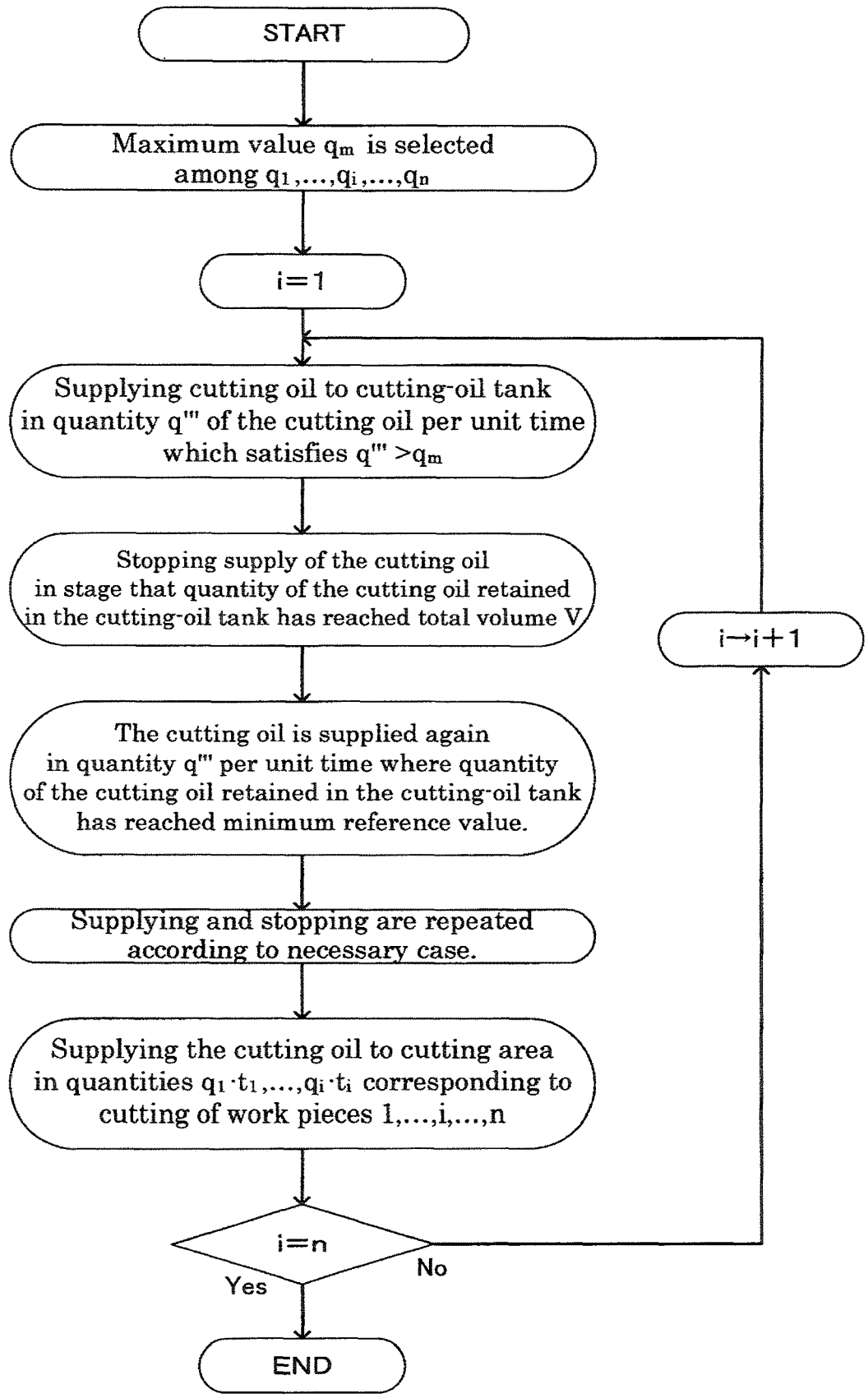

[Fig. 6]
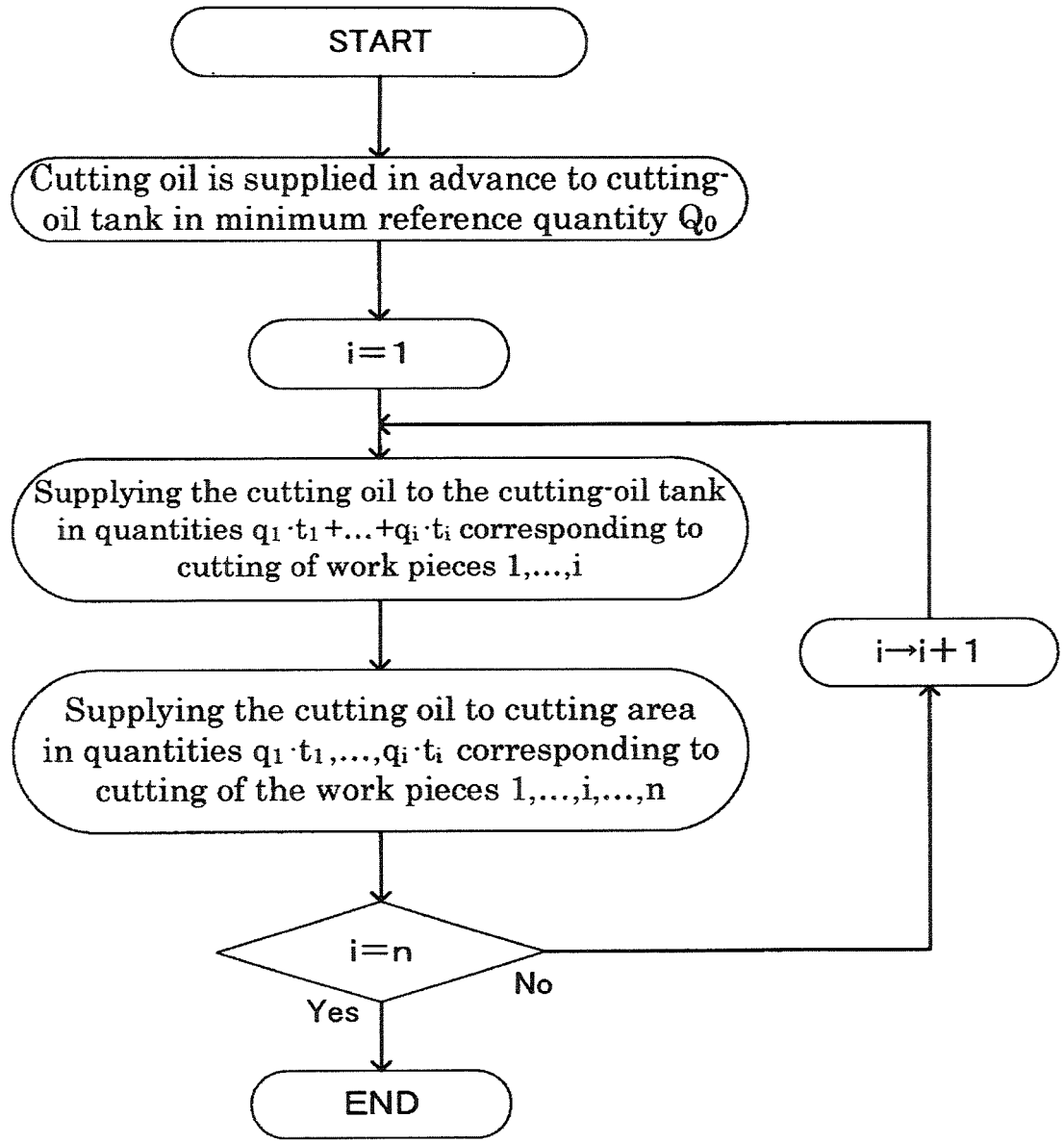

METHOD FOR SUPPLYING CUTTING OIL

TECHNICAL FIELD

The present invention relates to a method for supplying cutting oil which is used in a machine tool for cutting work pieces to a cutting-oil tank and a cutting area.

BACKGROUND ART

Where a machine tool is used to cut work pieces, it is essential to supply cutting oil to a cutting area in order to cool heat generated at the cutting area and also reduce cutting resistance.

It is well known that a quantity of cutting oil to be supplied is controlled corresponding to cutting of a work piece.

For example, in Patent Document 1, cutting oil to be supplied to a cutting area is varied in quantity, depending on a change in cutting length and cutting resistance (claims 1, 2 and 3), and in Patent Document 2, cutting oil to be supplied to a cutting area is controlled for a quantity thereof corresponding to loads of a driving motor necessary for cutting (Abstract).

A machine tool is provided with a cutting-oil tank for supplying cutting oil to a cutting area. Each of the above-described prior arts requires such a technical premise that cutting oil is normally supplied to a cutting-oil tank as a matter of course.

However, the above-described technical premise is not always satisfied.

Explaining concretely, quantity of cutting oil supplied per unit time to a cutting area is different according to each workpiece. However in the prior arts, where one or a plurality of types of work pieces are cut, a special technical consideration is not necessarily given to appropriate supply of cutting oil to a cutting-oil tank so that the cutting oil can be supplied appropriately from the cutting-oil tank on cutting each work piece.

Incidentally, Patent Document 3 discloses a configuration in which cutting oil separated from chips is supplied to a cutting-oil tank 3 (Abstract). However, in this case, no adjustment is set for a quantity of the cutting oil to be supplied to the cutting-oil tank after consideration is given to a quantity of the cutting oil necessary for cutting a work piece.

Patent Document 4 discloses a configuration in which a first cutting-oil tank and a second cutting-oil tank are adjusted so as to be substantially equal in temperature (claim 1). However, no adjustment is set for a quantity of cutting oil supplied to both the cutting-oil tanks after consideration is given to a quantity of the cutting oil necessary for cutting a work piece.

When cutting oil is not supplied sufficiently to the cutting-oil tanks, resulting in outflow from the tanks and the cutting oil is supplied to a cutting area in a larger quantity than before, cutting work must be stopped because the cutting oil is used up in the cutting-oil tanks.

The above-described stopping inevitably causes a serious decrease in work efficiency of a machine tool.

In order to avoid the above-described state of stopping, there can be expected such a method that when cutting oil inside a cutting-oil tank reaches a minimum reference quantity, the cutting oil is automatically supplied from a cutting-oil supply source to the cutting-oil tank to achieve a state in excess of the minimum reference quantity.

Cutting oil necessary for cutting work pieces is different in quantity, according to the types of work pieces. However in the above-described method, a reference quantity by which the cutting oil is supplied to the cutting-oil tank is not necessarily clear, with the above difference taken into account.

As is above described, in prior arts, it may be estimated that no technically significant proposal has been set about supply of cutting oil to a cutting-oil tank or a cutting area in an appropriate quantity after consideration is given to the fact that the cutting oil is different in a necessary quantity according to the types of work pieces to be cut.

PRIOR ART DOCUMENTS

Patent Documents

[Patent Document 1] Japanese Published Unexamined Patent Application No. H6-023651
[Patent Document 2] Japanese Published Unexamined Patent Application No. H6-23612
[Patent Document 3] Japanese Published Unexamined Patent Application No. H8-196826
[Patent Document 4] Japanese Patent No. 5202142

SUMMARY OF INVENTION

Problem to be Solved

An object of the present invention is to provide a configuration which supplies cutting oil appropriately to a cutting-oil tank and a cutting area based on the fact that in a machine tool for cutting work pieces, the cutting oil is different in a necessary quantity according to types of the work pieces.

Means for Solving the Problem

In order to solve the above problem, a basic configuration of the present invention stands on following of (1), (2), (3), (4), (5) and (6).

(1) The following processes have been adopted in a method for supplying cutting oil to a machine tool for cutting work pieces:

a: setting cutting times $t_1, \ldots, t_i, \ldots, t_n$ for work pieces $1, \ldots, i, \ldots, n$ and selection of cutting oil to be used wherein n is an integer of one or more, b: setting quantities $q_1, \ldots, q_i, \ldots, q_n$ of the cutting oil supplied per unit time according to a cutting area of the work pieces $1, \ldots, i, \ldots, n$, where the cutting oil selected by process a is used, c: supplying the cutting oil to a cutting-oil tank, with such a state kept that the cutting oil remains in the cutting-oil tank, and d: supplying the cutting oil to the cutting area by setting quantities of the cutting oil to be $q_1 t_1, \ldots, q_i t_i, \ldots, q_n t_n$ on cutting the work pieces $1, \ldots, i, \ldots, n$.

(2) The method for supplying cutting oil according to the above-described (1), wherein when a volume of the cutting-oil tank is given as V in the method for supplying the cutting oil to the cutting-oil tank that is described in process c, a quantity q of a fixed value supplied per unit time is set under the condition that inequalities of $q > q_1, \ldots, q_i, \ldots, q_n$ and $$q \leq (V + q_1 t_1 + \ldots + q_i t_i + \ldots + q_n t_n)/(t_1 + \ldots + t_i + \ldots + t_n) \quad \text{[Formula 1]}$$

are each satisfied, and the cutting oil is continuously supplied to the cutting-oil tank by the quantity q over an entire period of time during which the work pieces 1, ..., i, ..., n are cut.

(3) The method for supplying cutting oil according to the above-described (1), wherein a quantity q' is set as a fixed value to be supplied to the cutting-oil tank per unit time, wherein for some $i_0 < n$:

$$q' \leq (V + q_1 t_1 + \ldots + q_{i_0} t_{i_0})/(t_1 + \ldots + t_{i_0}) \text{ and}$$

$$q' > (q_1 t_1 + \ldots + q_n t_n)/(t_1 + \ldots + t_{i_0})$$

wherein V is the volume of the cutting-oil tank, and the quantity of the oil in the cutting-oil tank before cutting is set to be zero, and supplying the cutting oil to the cutting-oil tank by the quantity q' over a period of time $t_i + \ldots + t_{i_0}$, and thereafter not supplying the cutting oil to the cutting-oil tank.

(4) The method for supplying cutting oil according to the above-described (1), wherein when a volume of the cutting-oil tank is given as V in the method for supplying the cutting oil to the cutting-oil tank that is described in process c, setting each quantity $q_1'', \ldots, q_i'', \ldots, q_n''$ of a fixed value supplied per unit time under condition that inequalities of $$q_i'' > q_1, \ldots, q_i, \ldots, q_n \text{ and}$$

$$(q_1'' - q_1)t_1 + \ldots + (q_i'' - q_i)t_i + \ldots + (q_n'' - q_n)t_n \leq V,$$

are each satisfied, and the cutting oil is supplied to the cutting-oil tank at each of the quantities $q_1'', \ldots, q_i'', \ldots, q_n''$, corresponding to cutting each of the work pieces 1, ..., i, ..., n.

(5) The method for supplying cutting oil according to the above-described (1), wherein in the method for supplying the cutting oil to the cutting-oil tank that is described in process c, setting a quantity q''' of a fixed value supplied per unit time under conditions that selecting a maximum value $q_m$ among $q_1, \ldots, q_i, \ldots, q_n$, an inequality of $q''' > q_m$ is satisfied, and the cutting oil is supplied to the cutting-oil tank by the quantity q''' continuously corresponding to cutting the work pieces 1, ..., i, ..., n, then supply of the cutting oil to the tank is stopped in a stage that the cutting-oil tank is filled with the cutting oil, and the cutting oil is again supplied to the cutting-oil tank by the quantity q''' at a stage that the quantity of the cutting oil retained in the cutting-oil tank has reached a minimum reference quantity due to the thus stopped supply, and thereafter the stopping and the supply are repeated according to necessary case.

(6) The method for supplying cutting oil according to the above-described (1), wherein in the method for supplying the cutting oil to the cutting-oil tank that is described in process c, cutting oil $Q_0$ of an initial reference quantity is supplied in advance to the cutting-oil tank prior to cutting of the work pieces 1, ..., i, ..., n, and after start of cutting of the work pieces 1, ..., i, ..., n, the cutting oil is supplied to the cutting-oil tank by the individual quantities $q_1, \ldots, q_i, \ldots, q_n$ of the cutting oil per unit time corresponding to the cutting times $t_1, \ldots, t_i, \ldots, t_n$.

Advantageous Effects of Invention

In the present invention standing on the basic configurations of (1), (2), (3), (4), (5) and (6), it is possible to continue cutting the work pieces without stopping, corresponding to individual types of the work pieces to be cut, by supplying the cutting oil to a cutting area so as to prevent the cutting oil from being used up in a cutting-oil tank and keeping such a state that the cutting oil remains therein.

BRIEF DESCRIPTION OF DRAWINGS

FIG. 1 is a flowchart which shows steps of the basic configuration (1).
FIG. 2 is a flowchart which shows steps of the basic configuration (2).
FIG. 3 is a flowchart which shows steps of the basic configuration (3).
FIG. 4 is a flowchart which shows steps of the basic configuration (4).
FIG. 5 is a flowchart which shows steps of the basic configuration (5).
FIG. 6 is a flowchart which shows steps of the basic configuration (6).

DESCRIPTION OF EMBODIMENTS

The basic configuration (1) shows a basic principle of the present invention.

Specifically, in the process a, each of the cutting times $t_1, \ldots, t_i, \ldots, t_n$ is set for each of the work pieces to be cut, 1, ..., i, ..., n and cutting oil to be used is selected, thereby setting and selecting basic technical matters of all the processes wherein n is an integer of one or more.

In the process b, when the work pieces 1, ..., i, ..., n are cut, the quantities $q_1, \ldots, q_i, \ldots, q_n$ of the cutting oil supplied per unit time are set according to a cutting area. These quantities supplied per unit time are based on an understanding of an appropriate maximum value and an appropriate minimum value obtained from past experiences or experiments performed in advance, the above-described quantities $q_1, \ldots, q_i, \ldots, q_n$ are therefore to be selected within a range of the maximum value and the minimum value.

In the process c, the cutting oil in the quantities $q_1 t_1, \ldots, q_i t_i, \ldots, q_n t_n$ to flows out from the cutting-oil tank and also is supplied to the cutting area in a cutting step of the work pieces 1, ..., i, ..., n selected and set by the processes a and b. The cutting oil is supplied in a quantity in excess of the quantity which has flowed out from the cutting-oil tank, that is, with a state of retaining the cutting oil.

Therefore, when a quantity of the cutting oil supplied to the cutting-oil tank until cutting of the work pieces 1, ..., i is given as Q, it is essential that an inequality of $Q - (q_1 t_1 + \ldots + q_i t_i) > 0$ is satisfied in a range of $i = 1 \sim n$.

Such an embodiment that the above-described inequality is automatically satisfied will be as per described later in accordance with the basic configurations (2) to (6). In the process c, the above-described inequality is not only satisfied automatically but also satisfied by artificial processing with a manual operation.

Explaining according to concrete example, in a cutting stage of the work pieces 1, ..., i, a quantity supplied per unit time is manually set so that a quantity $Q_1$ of cutting oil in excess of quantities of $q_1 t_1 + \ldots + q_i t_i$ can be supplied to the cutting-oil tank during a period of time $t_1 + \ldots + t_i$, and in a cutting stage of the work pieces i+1, ..., n, a quantity supplied per unit time is set manually so that a quantity $Q_2$ of the cutting oil in excess of $q_{i+1} t_{i+1} + \ldots + q_n t_n$ can be supplied from a supply source to the cutting-oil tank during a period of time $t_{i+1}+\ldots+t_n$, thus making it possible to perform such processing that can satisfy the above-described inequality.

The above-described processing can be achieved, as a matter of course, not only the example divided by two stages as described above but also an example divided by a single stage or by three or more stages.

In the process of d, under a premise that the cutting oil is supplied to the cutting-oil tank according to the process c and on the basis of cutting times $t_1, \ldots, t_1, \ldots, t_a$ set by the process a and the quantities $q_1, \ldots, q_i$ of the cutting oil supplied per unit time set by the process b, corresponding to cutting of the work pieces $1, \ldots, i, \ldots, n$, the cutting oil flows out from the cutting-oil tank in quantities $q_1 t_1, \ldots, q_i t_i, \ldots, q_n t_n$ and also is supplied to the cutting area, and so a step of the final stage is achieved.

Then, at a stage that cutting of the work pieces $1, \ldots, i$ is ended, the cutting oil is supplied to the cutting area in quantities of $(q_1 t_1 + \ldots + q_i t_i)$.

Now the cutting oil is subjected to circulation processing in which, after supply to a cutting area, the cutting oil is ordinarily returned again to the cutting-oil tank by removing chips, etc., generated by the cutting by an evaporation occurring from the above-described circulation and also by the removal with disposal of waste including chips, etc., the cutting oil is gradually decreased in quantity. So the cutting oil is supplied to the cutting-oil tank by replacement of the thus decreased quantity.

Each of the processes of a to d in the basic configuration (1) can be summarized by the flowchart of FIG. 1.

The basic configurations (2) to (5) correspond to an embodiment which automatically achieves the process of c in the basic configuration (1).

In the basic configuration (2), the cutting oil is supplied in a fixed quantity of q per unit time over an entire period of time during which each of the work pieces $1, \ldots, i, \ldots, n$ is cut.

In the basic configuration (2), since selected q satisfies an equation of $q > q_1, \ldots, q_i, \ldots, q_n$, $$q(t_1+\ldots+t_i)-(q_1 t_1+\ldots+q_i t_i)=(q-q_1)t_1+\ldots+(q-q_i)t_i>0 \quad \text{[Formula 2]}$$

is satisfied, and the above-described inequality is satisfied until i=n, thus it is possible to retain a state that the cutting oil is not used up in the cutting-oil tank but remains in the cutting-oil tank.

In the basic configuration (2), since the above-described inequality is satisfied, the cutting oil retained in the cutting-oil tank is increased in quantity according to sequential cutting of the work pieces $1, \ldots, i, \ldots, n$.

In the basic configuration (2), when a volume of the cutting-oil tank is given as V, since the following $$q \leq (V+q_1 t_1+\ldots+q_i t_i+\ldots+q_n t_n)/(t_1+\ldots t_i+\ldots+t_n) \quad \text{[Formula 3]}$$

is satisfied, therefore the following $$q(t_1+\ldots+t_i+\ldots+t_n)-(g_1 t_1+\ldots+q_i t_i+\ldots+q_n t_n) \leq V \quad \text{[Formula 4]}$$

is satisfied. A difference between a quantity of the cutting oil supplied to the cutting-oil tank and a quantity flowed out from the cutting-oil tank is not more than a volume V of the cutting-oil tank. Thus, the cutting-oil tank may be filled up with the cutting oil but the cutting oil will not overflow.

If consideration is given to the inequality of q, that is, $q > q_1, \ldots, q_i, \ldots, q_n$ and the inequality of [Formula 3], it is essential that the inequality of $$q_i(t_1+\ldots+t_i+\ldots+t_n)<(V+q_1 t_1+\ldots+q_i t_i+\ldots+q_n t_n) \quad \text{[Formula 5]}$$

is satisfied on cutting the work pieces $1, \ldots, i, \ldots, n$, and the basic configuration (2) entirely stands on satisfaction of the above-described inequalities.

The basic configuration (2) is characterized by the cutting-oil being constantly supplied to the cutting-oil tank in a steady state, and process corresponding to processes c and d of the basic configuration (1) can be summarized by a flowchart of FIG. 2.

In the basic configuration (3), when a volume of the cutting-oil tank is given as V in the process of c, after selection of $i=i_0$ in which $$(V+q_1 t_1+\ldots+q_i t_i)/(t_1+\ldots+t_i) \quad \text{[Formula 6]}$$

is given as a minimum value, the cutting oil is supplied to the cutting-oil tank intermittently, that is, the cutting oil is supplied until cutting of a work piece $i_0$ but no cutting oil is supplied thereafter under conditions of $i_0 \leq n-1$.

In the basic configuration (3), there is set a quantity q' of the cutting oil supplied per unit time to the cutting-oil tank which will satisfy $$q' \leq (V+q_1 t_1+\ldots+q_{i0} t_{i0})/(t_1+\ldots+t_{i0}) \quad \text{[Formula 7]}$$

and $$q' > (q_1 t_1+\ldots+q_n t_n)/(t_1+\ldots+t_{i0}). \quad \text{[Formula 8]}$$

In the case of $i=i_0$, if consideration is given to the fact that the above-described [Formula 6] is minimum, $$q' \leq (V+q_1 t_1+\ldots+q_{i0} t_{i0})/(t_1+\ldots+t_{i0}) \leq (V+q_1 t_1+\ldots+q_i t_i)/(t_1+\ldots+t_i)$$

$$(i=1,\ldots,n-1)$$

is satisfied in relation to the above-described [Formula 6] which is not limited to $i=i_0$.

Therefore, in a range of $i=1, \ldots, i, \ldots, n-1$, $$q'(t_1+\ldots+t_i)-(q_1 t_1+\ldots+q_i t_i) \leq V$$

is satisfied, and then in a cutting stage of the work pieces $1, \ldots, i, \ldots, n-1$, the cutting oil will never overflow from the cutting-oil tank.

Further, in a cutting stage of a work piece of n, as long as no cutting oil is supplied to the cutting-oil tank in a quantity of q' supplied per unit time, as a matter of course, the cutting oil will not overflow from the cutting-oil tank in any of the cutting steps.

Since, by the inequality of [Formula 8], $$q'(t_1+\ldots+t_{i0})-(q_1 t_1+\ldots+q_i t_i+\ldots+q_n t_n)>0$$

is satisfied, it is possible to keep a state that the cutting oil remains in the cutting-oil tank without being used up in the cutting-oil tank.

When consideration is set to the inequalities of [Formula 7] and [Formula 8] on q', in the basic configuration (3), there is a basic premise that $$q_1 t_1+\ldots+q_i t_i+\ldots+q_n t_n < V+q_1 t_1+\ldots+q_{i0} t_{i0}$$

is satisfied, in other words, $$q_{i0+1} t_{i0+1}+\ldots+q_n t_n < V$$

is satisfied.

The basic configuration (3) is characterized by finishing supply of the cutting oil to the cutting-oil tank in a short period of time when $i_0$ giving [Formula 6] as a minimum value is apparently smaller than a total number n of the work pieces and process corresponding to processes c and d of the basic configuration (1) can be summarized by a flowchart of FIG. 3.

In the basic configuration (4), the cutting oil is supplied in such a state that a quantity supplied to the cutting-oil tank per unit time can be changed corresponding to a sequential change of a work piece i which is to be cut.

In the basic configuration (4), each $q_i''$ which satisfies inequalities of $$q_i'' > q_1, \ldots, q_i, \ldots, q_n$$

and $$(q_1''-q_1)t_1 + \ldots + (q_i''-q_i)t_i + \ldots + (q_n''-q_n)t_n \leq V \quad \text{[Formula 9]}$$

is set, and the cutting oil is supplied to the cutting-oil tank in the quantity of $q_i''$ supplied per unit time corresponding to cutting of each work piece i.

By the above-described inequalities between q and $q_1, \ldots, q_i$, $$q_1''t_1 + \ldots + q_i''t_i - (q_1t_1 + \ldots + q_it_i) = (q_1''-q_1)t_1 + \ldots + (q_i''-q_i)t_i > 0 \quad \text{[Formula 10]}$$

is satisfied, and there is reliably no possibility that the cutting oil in the cutting-oil tank becomes empty when a work piece i is being cut at any stage from the start of cutting to a halfway cutting thereof, and this will be also kept unchanged even at the final stage of i=n.

The cutting oil in the cutting-oil tank is increased in quantity as cutting of the work pieces $1, \ldots, i, \ldots, n$ proceeds sequentially.

However the above-described inequality of [Formula 9] shows that a difference between a quantity of the cutting oil supplied to the cutting-oil tank and a quantity flowed out from the cutting-oil tank is not more than the volume V of the cutting-oil tank and also means that no cutting oil will overflow from the cutting-oil tank.

The basic configuration (4) is characterized by supplying the cutting oil appropriately corresponding to a change in the work pieces to be cut, and processes corresponding to processes c and d of the basic configuration (1) can be summarized by a flowchart shown in FIG. 4.

In the basic configuration (5), a maximum value $q_m$ is selected among quantities $q_1, \ldots, q_i, \ldots, q_n$ of the cutting oil supplied per unit time, and the cutting oil is supplied to the cutting-oil tank in $q''' > q_m$, in other words, in a quantity of $q'''$ supplied per unit time which is larger than the above-described maximum value $q_m$.

Describing individual actions, when the cutting oil is supplied to the cutting-oil tank in the quantity of q per unit time, there is a case that the cutting oil is supplied to the cutting-oil tank up to a full capacity thereof, that is, until the tank is filled up, however in this case, the supply is stopped.

Due to the above-described stopping, the cutting oil inside the cutting-oil tank is gradually decreased in quantity.

However, when the cutting oil is decreased to a minimum reference quantity, the cutting oil is again supplied to the cutting-oil tank in a quantity of $q''$ supplied per unit time, and operation of the stopping and the supply is repeated according to necessary case.

A relationship between q and $q_m$ can be set as a linear equation, for example, $$q''' = \alpha q_m + \beta \text{ (note that } \alpha > 1, \beta \geq 0),$$

and the relationship is not always limited thereto.

Now when a time lag between a state of a minimum reference quantity detected by a controller and the supply of the cutting oil in the quantity of $q'''$ is expressed as $\Delta t$, it is essential that the minimum reference quantity is equal to or greater than $q_m \cdot \Delta t$.

However, for safety, it is desirable that the minimum reference quantity is not set to be $q_m \cdot \Delta t$ as described above but set to be $q_m \cdot t_m$ after selection of the maximum time of $t_m$ from $t_1, \ldots, t_i, \ldots, t_n$.

The basic configuration (5) is characterized by eliminating the need for cumbersome calculations by using the inequalities such as the basic configurations (2) to (4) and process corresponding to processes c and d of the basic configuration (1) can be summarized by a flowchart shown in FIG. 5.

In the basic configuration (6), the cutting oil is supplied to the cutting-oil tank corresponding to the cutting times $t_1, \ldots, t_i, \ldots, t_n$ in quantities equal to the quantities $q_1, \ldots, q_i, \ldots, q_n$ of the cutting oil supplied per unit time for cutting the work pieces $1, \ldots, i, \ldots, n$, and the cutting oil is, in advance, supplied in an initial reference quantity $Q_0$ before start of cutting.

When, on cutting the work piece 1, the cutting oil is supplied to the cutting-oil tank in a quantity of $q_i$ that is a quantity supplied per unit time from the cutting-oil tank and the cutting oil is also supplied from the cutting-oil tank to a cutting area in the quantity of $q_1$, the minimum reference quantity $Q_0$ will be theoretically sufficient as long as it is $q_1 \cdot \Delta t$ or more on the assumption that a time lag between supply of the cutting oil to the cutting-oil tank and the supply thereof to the cutting area is given as $\Delta t$.

However, in real action, it is desirable that the initial reference quantity is set to be $Q_0 = q_1 \cdot t_1$, with consideration given to the safety.

The basic configuration (6) is simple in supplying the cutting oil in that the cutting oil is supplied to the cutting-oil tank at the same pace as it is supplied to the cutting area.

That is, the basic configuration (6) does not need technical premises set by the inequalities or requirements of the quantities as found in the basic configurations (2), (3), (4) and (5).

The basic configuration (6) is characterized by the simple supply of the cutting oil as described above, and process corresponding to processes c and d of the basic configuration (1) can be summarized by a flowchart shown in FIG. 6.

Hereinafter, a description will be given by referring to examples.

Example 1

Example 1 is characterized in that alarm signals are generated when quantity of the cutting oil is decreased lower than a predetermined quantity due to evaporation of the cutting oil from the cutting-oil tank or an accident such as leakage, etc., resulting from chips being clogged in the cutting-oil tank, and in the case of leakage, the cutting oil is supplied to the cutting-oil tank in such a quantity per unit time that a quantity per unit time equal to a decreased quantity due to the leakage or a quantity larger than the above quantity per unit time is added to a quantity supplied before occurrence of the accident.

As long as the cutting oil is supplied to the cutting-oil tank and flows out from the cutting-oil tank according to the basic configurations (1) to (6), there is no possibility that the cutting oil in the cutting-oil tank becomes empty.

It is, however, impossible to exclude any possibility of evaporation of the cutting oil or an accident due to leakage resulting from chips being clogged in the cutting-oil tank.

So if the cutting oil is used up due to the evaporation or the leakage and no cutting oil remains, and as a result, there is no choice but to stop cutting work.

In Example 1, in the case of leakage, the cutting oil is supplied to the cutting-oil tank in such a quantity per unit time that is equal to a decreased quantity per unit time due to the leakage or a quantity larger than the above quantity per unit time is added, by which it is possible to continue cutting work without stopping also in a stage that the leakage from the cutting-oil tank has been recovered.

Example 2

Example 2 is characterized in that water-soluble cutting oil is adopted, by which the larger the content of water is, the higher the concentration of the water-soluble cutting oil supplied to a cutting-oil tank is set.

The water-soluble cutting oil develops a compatible state of oil components and water by an action of a surfactant.

When the concentration is different from a reference value, there is a tendency that lubrication functions are decreased at a cutting portion. Thus, in Example 2, the larger the content of water in relation to the cutting oil inside the cutting-oil tank is, the higher the concentration of the water-soluble cutting oil supplied to the cutting-oil tank is set, and then a ratio of cutting oil to the water inside the cutting-oil tank is adjusted to a predetermined concentration, thereby realizing an optimal concentration of the water-soluble cutting oil at a cutting area.

There is a case that the water-soluble cutting oil is different in appropriate content of water according to the types of work pieces.

As is in this case, in Example 2, on the basis of the basic configuration (4), the water concentration is adjusted corresponding to each of the work pieces $1, \ldots, i, \ldots, n$, and then the above adjustment makes it possible to set an appropriate content of the water on cutting each of the work pieces $1, \ldots, i, \ldots, n$.

INDUSTRIAL APPLICABILITY

The present invention is able to keep a cutting state without stopping by continuously supplying cutting oil to a cutting area of a machine tool for cutting work pieces and, therefore, can be used in all types of machine tools for cutting work pieces.

What is claimed is:

1. A method for supplying cutting oil in a machine tool for cutting plural kinds of work pieces, comprising the steps of:
    a: in advance of cutting the work pieces $1, \ldots, i, \ldots, n$, setting cutting times $t_1, \ldots, t_i, \ldots, t_n$ for each work piece $1, \ldots, i, \ldots, n$ and selecting a cutting oil to be used, wherein n is an integer of not less than two, and associating a kind of work with each ith work piece,
    b: setting quantities $q_1, \ldots, q_i, \ldots, q_n$ of the cutting oil supplied to the work pieces $1, \ldots, i, \ldots, n$ per unit time in accordance with the cutting area of the work pieces $1, \ldots, i, \ldots, n$,
    c: setting a quantity q' as a fixed value to be supplied to the cutting-oil tank per unit time, wherein for some $i_0 < n$:
    $$q' \leq (V + q_1 t_1 + \ldots + q_{i0} t_{i0})/(t_1 + \ldots + t_0) \text{ and}$$
    $$q' \geq (q_1 t_1 + \ldots + q_n t_n)/(t_1 + \ldots + t_{i0})$$
    wherein V is the volume of the cutting-oil tank, and the quantity of the oil in the cutting-oil tank before cutting is set to be zero, and
    supplying the cutting oil to the cutting-oil tank by the quantity q' over a period of time $t_1 + \ldots + t_{i0}$, and thereafter not supplying the cutting oil to the cutting-oil tank,
    d: supplying the cutting oil, from the cutting-oil tank, to the cutting area at a rate of $q_1 t_1, \ldots, q_i t_i, \ldots, q_n t_n$ for cutting the work pieces $1, \ldots, i, \ldots, n$.

2. The method for supplying cutting oil according to claim 1, wherein
    when water-soluble cutting oil is adopted, adjusting a content ratio of the cutting oil to the water inside the cutting-oil tank to a predetermined concentration.

\* \* \* \* \*